3,689,286
RAPID PRODUCTION OF A CHEDDAR CHEESE FLAVORED PRODUCT
Anthony J. Luksas, Chicago, Ill., assignor to Beatrice Foods Co., Chicago, Ill.
No Drawing. Continuation of application Ser. No. 719,271, Apr. 5, 1968. This application Sept. 24, 1970, Ser. No. 75,724
Int. Cl. A23c 19/00
U.S. Cl. 99—115                                                4 Claims

ABSTRACT OF THE DISCLOSURE

Fermented flavor of the cheddar type is prepared by acidifying a protein, e.g. milk or recombined milk to form a curd and then inoculating the curd with micrococci and allowing the micrococci to grow. A flavor intensity of 100 times one year old cheddar is produced. The acidification is preferably carried out by growing nontoxic enterococci, bacilli on the protein medium.

---

This application is a continuation application of Ser. No. 719,271, filed on Apr. 5, 1968, and now abandoned.

The present invention relates to the preparation of a fermented flavor of the cheddar type.

To obtain a good cheddar flavor normally takes at least a year.

It is an object of the present invention to develop a cheddar flavor in a period of a week or less.

Another object is to prepare a cheddar flavor of greatly increased intensity over that of one year old conventional cheddar.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by acidifying a water containing fat and protein and/or no lactose source to form a slurry and then inoculating the slurry with micrococci and then allowing the micrococci to grow under controlled environment until the desired cheddar flavor is developed.

The initial media can be skim milk, whole milk or recombined milk. If recombined milk is employed there can be employed sodium caseinate, soy protein, cottonseed protein or any food grade protein. The fat source is normally butterfat, e.g. in the amount present in milk, i.e. 2.6 to 8.4% but this can be varied. It is also essential that lactose be present, or other utilizable carbohydrate. The amount present in milk, e.g. 2 to 6%, is adequate although this also can be increased or decreased. The preferred medium contains a whey plus a source of casein dispersed in water.

The initial media for the cheddar production can be acidified with nontoxic inorganic or organic acids, e.g. hydrochloric acid, acetic acid, maleic acid, tartaric acid, citric acid, phosphoric acid, lactic acid or the like to a pH of 4.8 to 5.4, preferably 5.2. However, the preferred method of acidifying the milk is the conventional procedure employing *Streptococcus lactis* or other lactic acid forming microorganisms until the pH is 4.8 to 5.4, preferably 5.2. Thus there can be used lactobacilli, enterococci, gram negative rods, aerobic nonspore forming bacilli. Of course the microorganisms should be nontoxic.

Examples of suitable organisms are enterococci including *Streptococcus lactis*, *S. faecolis*, *S. zymogenes*, *S. durans*, *S. liquefaciens*; lactobacilli such as *Lactobacillus casei*, *L. plantarum*, *L. bulgaricus*, *L. delbrueckii*; gram negative bacilli such as Escherichia, Pseudomonas, Proteus, Chromobacter, Flavobacterium, Aerobacter; aerobic spore formers such as *Bacillus subtilis*, *B. alvei*, *B. cereus*, *B. coagulans*.

Normally the milk is sterilized in conventional fashion, e.g. in an autoclave, prior to addition of the acidifying agent, e.g. microorganism. The microorganisms are allowed to grow until the proper pH is reached. At 72° F., this is normally not over 24 hours when using the *S. lactis*. The time will vary to some extent depending on the temperature which of course affects the growth rate of the microorganism. Under optimum growth temperature conditions generally not over one day is required.

After the desired pH is reached a curd is developed either by raising the temperature, e.g. to 113–122° F. or by adding rennet and incubating until a curd forms. The curd is centrifuged, the supernatant decanted and the curd washed with water.

Up to this point the process is conventional for forming cheddar cheese, e.g. see Kirk-Othmer "Encyclopedia of Chemical Technology," first edition, vol. 4, pages 810–812.

The curd thus prepared is suspended in water at 5 to 50% solids, preferably 15% and is then inoculated with a nontoxic micrococcus such as *Micrococcus caseolytics* (e.g. A.T.C.C. 13548), *Micrococcus conglomeratus* (e.g., A.T.C. 401) or *Micrococcus freudenreichii* (either A.T.C. 407 or A.T.C. 8459). The fermentation is then continued, preferably aerobically, with the micrococci at 68–113° F., preferably at 89.6° F. for 5–7 days with vigorous agitation. The agitation is important for rapid obtaining of the desired flavor. When less favorable growth temperatures are employed the fermentation must be continued somewhat longer, e.g. 2 weeks, to get an equivalent amount of cheddar flavor.

Unless otherwise indicated, all parts and percentages are by weight.

Example 1

Whole milk was pasteurized at 200° F. for 30 minutes, cooled to 72° F. and inoculated with *S. lactis* and incubated until the pH was 5.2. Rennet was then added and the milk incubated until a curd was formed. The curd was centrifuged, the supernatant decanted and the curd was then washed with water.

The curd was then sterilized in an autoclave to kill the *S. lactis*. Next the curd was suspended in water at 15% solids and inoculated with *Micrococcus caseolytics* (A.T.C.C. 13548) and fermentation continued aerobically with strong stirring to insure vigorous agitation at 32° F. for 6 days. The product had a typical cheddar flavor but had a cheddar flavor intensity approximately 100 times that of one year old cheddar even though the process of the invention took only a week from the first inoculation of the whole milk with the *S. lactis*.

The flavor thus produced was suitable as such for blending with other ingredients to impart a cheddar flavor thereto. Thus it was suitable for placing on apple pie or incorporating in cookie dough.

Example 2

A portion of the product of Example 1 was homogenized at 2500 p.s.i. and spray dried to give a more time stable form of the product. The spray dried material was also useful in imparting cheddar flavor to other materials, e.g. it can be sprinkled on crackers, or pie, incorporated into sour cream to make a cheddar flavored dip, etc.

While the curd was sterilized before adding the micrococcus in Example 1 and this is the preferred form of invention it is also possible to grow the micrococcus in conjunction with the organism used to form the pH of 4.8–5.4. In this case, however, the flavor is not as intense and after a week of growth of the micrococcus is only equivalent to one year old cheddar. The reason for this is that there are competing growth organisms. For this reason preferably the acid-forming organisms are killed before growing the micrococcus.

In the event the lactic acid forming organisms are allowed to stay in the curd when the micrococcus grows, then buffers such as the conventional citrate-phosphate or alkaline buffers should be used as otherwise, e.g. when using *S. lactis* or enterococci, the pH drops to 4 or lower and the micrococci won't grow.

If desired, the product of the invention can be sterilized, e.g. in an autoclave to kill the micrococci and give a product having a longer shelf life.

As used in the claims, the term "milk" when not modified is intended to include skim milk, whole milk or reconstituted milk as identified supra in the specification.

I claim:

1. A process of preparing a fermented cheddar cheese type flavor comprising preparing a medium containing a fat, a protein and a lactose source, acidifying the medium by growing a lactic acid producing bacteria therein to a pH of 4.8 to 5.4, forming a curd, removing the curd from the medium, destroying the lactic bacteria by sterilizing the curd, suspending the sterilized curd in water to provide a curd and water system containing about 5 to 50% curd solids, inoculating the curd and water system with at least one micrococcus selected from the group consisting of *Micrococcus caseolytics*, *Micrococcus conglomeratus* or *Micrococcus freudenreichii*, vigorously agitating the inoculated curd and water system while fermenting with said micrococcus as the sole inoculated microorganisms present in said system at 68° F. to 113° F. for about 5 to 7 days to obtain a cheddar cheese flavor of an intensity of at least about 100 times the intensity of one-year old natural cheddar cheese.

2. A process according to claim 1 wherein the medium is milk.

3. A process according to claim 1 wherein the medium is sodium caseinate and butterfat.

4. A process according to claim 1 wherein the micrococcus is *Micrococcus caseolyticus*.

References Cited

UNITED STATES PATENTS

| 3,446,627 | 5/1969 | Noznick et al. | 99—115 |
| 3,397,994 | 8/1968 | Elenbogen et al. | 99—116 |

FOREIGN PATENTS

| 12,413 | 1962 | Japan | 99—115 |

OTHER REFERENCES

Alford, et al.: Journal of Dairy Science, The American Dairy Science Association, The Ohio State University, Columbus, Ohio, vol. 33, 1950 (pp. 107, 112, 113, and 115–119).

A. LOUIS MONACELL, Primary Examiner

D. M. NAFF, Assistant Examiner

U.S. Cl. X.R.

99—140 R